(12) United States Patent
Fujikami

(10) Patent No.: US 7,743,485 B1
(45) Date of Patent: Jun. 29, 2010

(54) METHOD OF MANUFACTURING A SUPERCONDUCTING CABLE

(75) Inventor: Jun Fujikami, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/525,262

(22) Filed: Sep. 22, 2006

Related U.S. Application Data

(62) Division of application No. 10/781,718, filed on Feb. 20, 2004, now Pat. No. 7,151,225.

(30) Foreign Application Priority Data

| Jun. 19, 2003 | (JP) | ............... 2003/174657 |
| Dec. 24, 2003 | (JP) | ............... 2003/428296 |

(51) Int. Cl.
- *H01B 12/02* (2006.01)
- *H01B 13/00* (2006.01)
- *H02H 7/26* (2006.01)

(52) U.S. Cl. .................. 29/599; 174/125.1; 361/19

(58) Field of Classification Search ................ 29/599; 174/125.1, 15.4, 15.5; 361/9, 19; 505/230, 505/231, 850, 882, 887
See application file for complete search history.

(56) References Cited

U.S. PATENT DOCUMENTS

| 4,184,042 | A |   | 1/1980  | Vulis et al.     |           |
|-----------|---|---|---------|------------------|-----------|
| 5,171,941 | A | * | 12/1992 | Shimizu et al.   | 174/125.1 |
| 5,617,280 | A |   | 4/1997  | Hara et al.      |           |
| 5,859,386 | A |   | 1/1999  | Herrmann et al.  |           |
| 6,034,324 | A |   | 3/2000  | Dixon et al.     |           |
| 6,049,036 | A |   | 4/2000  | Metra            |           |
| 6,153,825 | A |   | 11/2000 | Ando et al.      |           |
| 6,743,984 | B2 |  | 6/2004  | Nassi et al.     |           |
| 6,762,673 | B1 |  | 7/2004  | Otto et al.      |           |
| 7,109,425 | B2 | * | 9/2006 | Reis et al.      | 174/125.1 |
| 7,149,560 | B2 |  | 12/2006 | Ohmatsu         |           |

FOREIGN PATENT DOCUMENTS

| AU | 739 105 B2    |   | 10/2001 |
| EP | 0 780 926 A1  |   | 6/1997  |
| JP | 01039230 A    | * | 2/1989  |

(Continued)

OTHER PUBLICATIONS

Patent Abstracts of Japan, vol. 016, No. 058 (P-1311), Feb. 13, 1992 (abstract only).

(Continued)

*Primary Examiner*—A. Dexter Tugbang
*Assistant Examiner*—Livius R Cazan
(74) *Attorney, Agent, or Firm*—Foley & Lardner LLP

(57) ABSTRACT

Provided is a superconducting cable having a structure such that cable cores, each having a superconducting layer, are housed in a thermal insulation pipe and the superconducting layer of each cable core has portions having different critical current values. When an excessive current flows in the superconducting layer in case of a short-circuit failure, the current exceeds the critical current value of the portion having a smaller critical current value first, which results in damage to the portion, suppressing the occurrence of damage to the other normal portion. A superconducting cable line using this superconducting cable and a splitter for accommodating the cable cores therein is also provided.

13 Claims, 3 Drawing Sheets

FOREIGN PATENT DOCUMENTS

| | | | | |
|---|---|---|---|---|
| JP | 02023029 | A | * | 1/1990 |
| JP | 2001-325836 | A | | 11/2001 |
| JP | 2003-141946 | | | 5/2003 |
| WO | WO 0070631 | A2 | * | 11/2000 |
| WO | WO 03/038840 | A1 | | 5/2003 |

OTHER PUBLICATIONS

Office Action dated May 8, 2008 from The Japanese Patent Office and English translation for counterpart application No. 2003-428296.

* cited by examiner

METHOD OF MANUFACTURING A SUPERCONDUCTING CABLE

CROSS-REFERENCE TO RELATED PATENT APPLICATIONS

This application is a division of application Ser. No. 10/781,718, filed Feb. 20, 2004, now U.S. Pat. No. 7,151,225, and based on Japanese Patent Application No. 2003-174657, filed Jun. 19, 2003 and Japanese Patent Application No. 2003-428296, filed Dec. 24, 2003, by Jun FUJIKAMI. This application claims only subject matter disclosed in the parent application and therefore presents no new matter.

BACKGROUND OF THE INVENTION

1. Field of the Invention

The present invention relates to a superconducting cable and a superconducting cable line including the superconducting cable. More particularly, the invention relates to a superconducting cable in which damage caused by a failure, for example, a short-circuit failure, can be reduced, and also relates to a superconducting cable line using this type of superconducting cable.

2. Description of the Related Art

Superconducting cables having a superconducting cable conductor formed of, for example, Bi-based high critical temperature (Tc) superconducting tapes, are known (see, for example, Japanese Unexamined Patent Application Publication No. 2001-325836). FIG. 3 is a sectional view illustrating a three-core three-phase superconducting cable 100 incorporating a plurality of cable cores 102. In this superconducting cable 100, the three cable cores 102 are stranded and housed in a thermal insulation pipe 101.

The thermal insulation pipe 101 is a double pipe structure such that a thermal insulating material (not shown) is disposed in the space between an outer pipe 101a and an inner pipe 101b, and the space is kept in a vacuum state. Each cable core 102 includes, sequentially from the center, a former 200, a superconducting conductor layer 201, (which is made of with superconducting wires, for example, and hereinafter referred to as the "superconducting conductor layer"), an electrical insulating layer 202, a shielding layer 203, and a protective layer 204. The superconducting conductor layer 201 and the shielding layer 203 are both superconducting layers formed by spirally winding superconducting wires in a multilayer form around the former 200 and the electrical insulating layer 202, respectively. Normally, a space 103 between the inner pipe 101b and each cable core 102 serves as a coolant channel. An anticorrosion layer 104 made of polyvinyl chloride is provided at the outer periphery of the thermal insulation pipe 101.

When the above-described multiphase superconducting cables are connected to each other or such a cable is connected to a normal conducting cable, or when a termination structure is formed, such work is performed for each cable phase, that is, by splitting the cable cores. In such a case, the cable cores are split in a splitter which is maintained at a cryogenic temperature by a coolant, and the cable cores are held in the splitter such that they are separated from each other.

When a short-circuit failure occurs in a normal conducting cable, a large current flows in the conductor. In a 66 kV normal conducting cable, for example, about 31.5 kA short-circuit current flows in the conductor. As in the normal conducting cable, a large short-circuit current flows in a superconducting conductor layer in case of a short-circuit failure.

Under normal operation, since the current flowing in a superconducting cable is a few kilo-amperes, the direct current (DC) critical current value $I_c$ of the superconducting layer is set to be, for example, $I_c \geq \sqrt{2} \times I_o$ with respect to the alternating current (AC) rated current $I_o$. However, since a superconducting conductor forming the superconducting layer generally is expensive, it is difficult in view of cost-effectiveness to increase the margin with respect to the critical current value $I_c$. When a short-circuit failure occurs to cause a short-circuit current to flow in the superconducting conductor layer having a relatively small margin in terms of the critical current value $I_c$, the superconducting state cannot be maintained in excess of the critical current value $I_c$, causing the superconducting layer to transit from a superconducting state to a normal conducting state. That is, so-called "quenching" occurs to cause the superconducting layer to generate heat, and the superconducting cable may be damaged due to an increase in the temperature.

In a multiphase superconducting cable, such as that shown in FIG. 3, when the cable cores housed in a splitter generate heat, the increased temperature vaporizes a coolant such as liquid nitrogen around the cable cores, which may result in excessive increase of the pressure in the splitter, consequently damaging the cable.

Such damage can be caused in any portion of the superconducting cable, and thus, a damaged portion is difficult to determine.

SUMMARY OF THE INVENTION

Accordingly, a main object of the present invention is to provide a superconducting cable in which serious damage can be prevented in case of a short-circuit failure.

Another object of the present invention is to provide a superconducting cable line using the above-described type of superconducting cable in which a damaged portion can be easily determined and excellent repairing workability is attained in case of a short-circuit failure.

In the present invention, the above-described objects can be achieved by differentiating the critical current of a superconducting layer.

More specifically, the present invention provides a superconducting cable including a superconducting layer which is provided with portions whose critical currents are different.

In a superconducting cable having a relatively small margin in terms of the DC critical current value, in case of a short-circuit failure, the superconducting layer generates heat due to quenching, and the cable may be damaged by increase of the temperature. In the present invention, therefore, a portion to be damaged when a large current flows in case of a failure is deliberately provided, and the other portions are prevented from being damaged, thereby reducing the possibility of the overall superconducting cable being damaged. The portion to be damaged is provided by differentiating the critical current of the superconducting layer.

More specifically, in the superconducting layer, a current limiting portion having a smaller critical current than the other portions may be provided. That is, in the present invention, the current limiting portion is provided to satisfy the condition expressed by $I_c > I_{ca} \geq \sqrt{2} \times I_o$ when $I_o$ indicates the AC rated current, $I_{ca}$ represents the critical current of the current limiting portion provided for the superconducting layer, and $I_c$ indicates the critical current of the other portions. If many portions having a small critical current value are provided, many portions will be damaged in case of a failure, decreasing the portion that can be protected from damage. Thus, it is time-consuming to repair such damaged portions.

Therefore, by providing only one or a few current limiting portions, damage to the overall superconducting cable can be reduced, and excellent repairing workability can be achieved.

The portion having a small critical current or the current limiting portion may be provided for at least one of the superconducting conductor layer or the shielding layer. That is, it may be provided only for the superconducting conductor layer or the shielding layer, or it may be provided for both of them.

The above-configured superconducting cable of the present invention can be suitably used in a superconducting cable line. In particular, if the superconducting cable of the present invention is a multiphase superconducting cable formed of a plurality of cable cores each having a superconducting layer, the following cable line may suitably be formed. The cable line of the present invention includes the above-described superconducting cable of the present invention and a splitter which houses the separated portions of the cable cores (hereinafter, such portion is referred to as the "core-separated portion"). The portions whose critical current values are differentiated are housed in the splitter.

As discussed above, in a cable line using a known superconducting cable, any portion of the cable line can be damaged in case of a short-circuit failure, and thus, the damaged portion is difficult to determine. In the superconducting cable of the present invention, however, a portion to be deliberately damaged in case of a failure is disposed at a specific position, and more specifically, in a splitter, so that the detection of damaged portion can be facilitated. Normally, superconducting cables are laid in duct lines under ground. Therefore, when the superconducting cable of the present invention is disposed at an indefinite position of a cable line, a portion to be subjected to damage may be located in a duct line under ground. In the duct line, generally, it is difficult, and may be practically impossible, to perform repairs. In the splitter, however, various operations can be performed; it is possible to check the inside of the splitter for inspection or replacement of the cables. Accordingly, the repair of a damaged portion can be performed easily.

The splitter is used for accommodating split cable cores of a multiphase superconducting cable therein. There are various types of splitters, for example, such as a termination joint box disposed at an end of the cable line, and an intermediate joint box disposed at an intermediate junction of the cable line and used for connecting cables. The splitter is filled with a coolant so that the core-separated portions of the cable cores can be cooled to maintain their superconducting state. Accordingly, the splitter is preferably of a thermal insulation structure. In case of a short-circuit failure, heat is generated at the portions of the cable cores in the splitter where the critical current value is small. The coolant around the heated portions then vaporizes to excessively increase the pressure inside the splitter, which may result in damage to the cable cores. Thus, to prevent an increase in the pressure caused by vaporization of the coolant, a regulating valve may preferably be provided in the splitter.

The portion having a small critical current value may be disposed at any position of the cable cores disposed in the splitter. Preferably, it is disposed at a position away from the core-splitting portion of the assembled cores, that is, at a position where the distance between the separated cable cores is larger: for example, at the split end side of the cable cores in the case of a termination joint box, and at a central portion in the case of an intermediate joint box, so that higher repairing workability can be attained.

Holding fixtures may be used for holding the cable cores in the splitter. Holding fixtures may hold each of the cable cores in a state in which the cable cores are separated from each other, and preferably the holding fixtures are movable in the splitter in accordance with the expansion and contraction of the cable cores.

In the superconducting cable of the present invention, by deliberately providing a portion whose critical current value is differentiated, damage due to short-circuit failure may occur at the portion only, and the occurrence of such damage to all over the superconducting cable can be restrained. Thus, the possibility of overall damage to the cable can be reduced. Furthermore, in case of a short-circuit failure, a damaged portion can be easily predetermined. In the superconducting cable line using the superconducting cable of the present invention, the portions to be damaged are disposed in a splitter and consequently the damaged portion can be determined easily, allowing excellent repairing workability.

In the present invention, by providing a regulating valve for regulating the pressure in the splitter, an increase in the pressure inside the splitter can effectively be prevented from being caused by the vaporization of a coolant due to heat generated by a short-circuit current, and accordingly, damage to the cable cores due to an increase in the pressure can be reduced or eliminated.

DETAILED DESCRIPTION OF THE PREFERRED EMBODIMENTS

Figure 1:
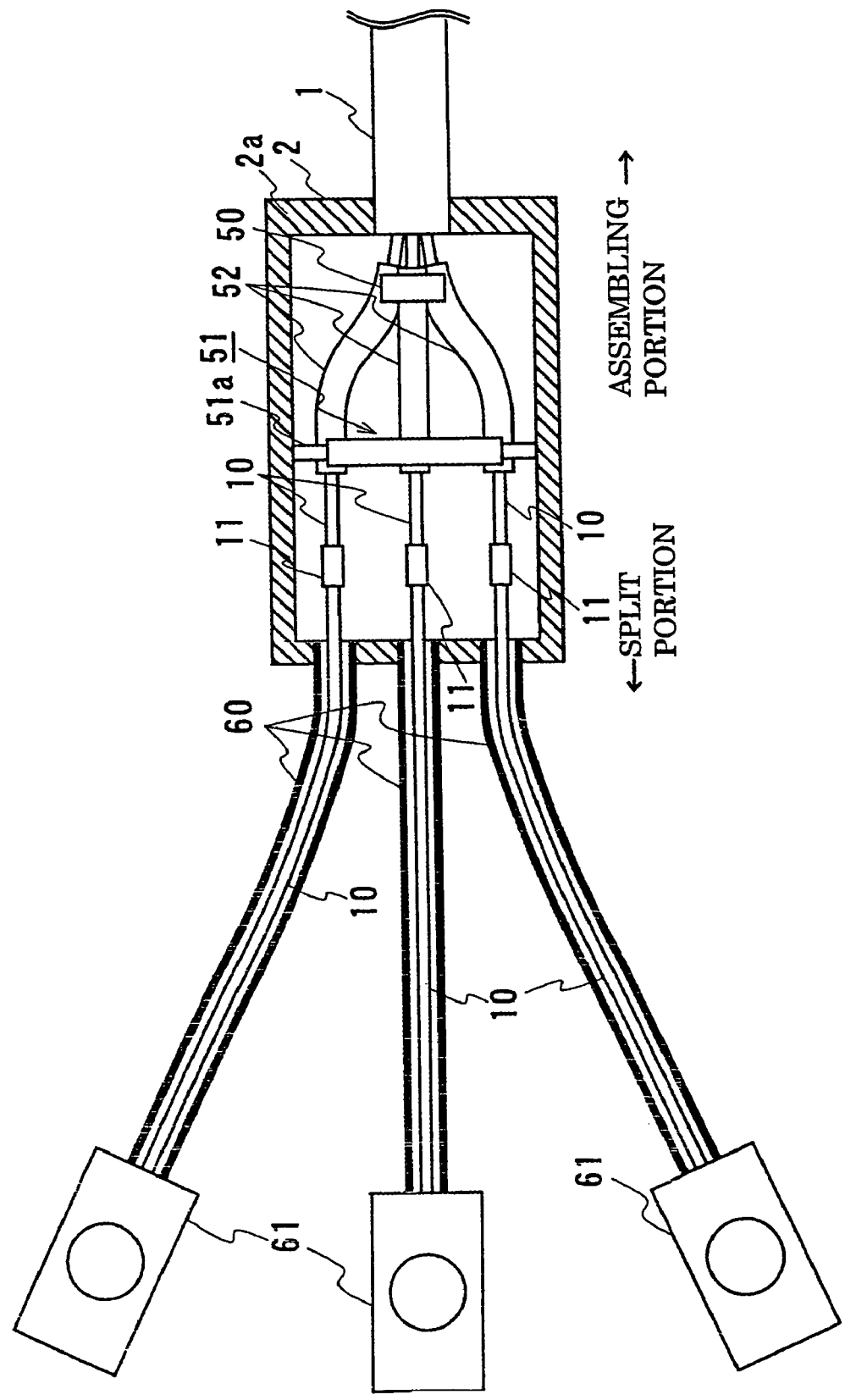
FIG. 1 is a schematic diagram illustrating a terminating portion of a cable line having a superconducting cable of the present invention; the current limiting portions of the cable cores are located in a termination joint box.

The present invention is described in detail below. A superconducting cable of the present invention has a cable core including a superconducting conductor layer and a shielding layer made of superconducting wires. It may be a single-phase superconducting cable including one cable core or a multiphase superconducting cable including a plurality of cable cores. In the latter case, a three-core three-phase superconducting cable may be formed by housing stranded three cable cores in a thermal insulation pipe. The shielding layer is provided around the electrical insulating layer covering the outer periphery of the superconducting conductor layer, and a current induced by the current flowing in the superconducting conductor layer flows in the shielding layer, thereby generating a magnetic field which has the function of canceling the magnetic field generated in the superconducting conductor layer.

In the superconducting cable of the present invention, the above-described superconducting layer is provided with portions having different critical current values. For example, a portion having a large critical current value and a portion having a small critical current value are provided such that in case of a failure the former portion is protected with the latter portion being subjected to damage. In case of a short-circuit failure, when a large current flows, the current exceeds the critical current limit earlier in the portion having a small critical current value than in the portion having a large critical current value, and the portion having a small critical current value generates a large resistance and produces heat such that the portion having a small critical current value is damaged. That is, the portion having a small critical current value is quenched earlier than the portion having a large critical current value, thereby decreasing or eliminating damage to the portion having a large critical current value.

In the superconducting layer, the critical current value can be varied by changing various factors of the superconducting cable conductor forming the superconducting layer, and more specifically, by changing (1) the quantity of superconducting wire used in the superconducting cable conductor, (2) the amounts of respective materials constituting the superconducting wire, and (3) the kind of materials used in the superconducting wire, etc.

In the above example (1), the number of superconducting wires used for the portion having a small critical current value may be reduced as compared with the superconducting wires used for the portion having a large critical current value. That is, the number of superconducting wires wound on the former and on the electrical insulating layer is decreased. With this configuration, the superconducting wires forming the portion having a small critical current value are connected to a part of the superconducting wires forming the portion having a large critical current value. In this case, the junction of the superconducting wires may preferably be performed by a method producing a small joint resistance, for example, by using soldering or a copper compression sleeve. Superconducting tape using Bi-based, for example, Bi2223-phase oxide superconductors, may be used as the superconducting wires. The superconducting tape may be formed by, for example, the powder-in-tube method. More specifically, the material powder of a superconducting phase, for example, a Bi2223 phase, is inserted into a metal pipe made of, for example, Ag, and the pipe containing the powder is drawn into a clad wire. The clad wires thus made are bundled and inserted into a metal pipe made of, for example, Ag, and the pipe containing the clad wires is drawn into a multifilament wire. Subsequently, the multifilament wire is rolled and heat-treated so as to produce a superconducting tape.

In the above-described example (2), as in example (1), superconducting wires formed by the powder-in-tube method are used. In this case, for forming the superconducting wires used for the portion having a small critical current value, the amount of superconductor is made smaller than that for the portion having a large critical current value, and conversely, silver or silver alloy forming the superconducting wires is increased. That is, the number of superconducting wires for the portion having a small critical current value and that for the portion having a large critical current value are the same, and the amount of superconductor used for forming the superconducting wires is different with respect to the two portions.

In the above-described example (3), a Bi-based oxide superconductor formed by the powder-in-tube method is used for the portion having a large critical current value, and a so-called "bulk superconductor", that is, a superconductor made of a superconducting phase without a metal matrix such as Ag, may be used for the portion having a small critical current value. The superconducting phase of the bulk superconductor specifically includes the above-described Bi-based oxide superconducting phase, and a rare-earth based superconducting phase having a composition formula Re—Ba—Cu—O (Re represents a lanthanum series element, such as Y, Sm, Nd, or Pr). The specific composition of the rare-earth based superconducting phase may be $YBa_2Cu_3Ox$, $Y_2BaCuOx$, $NdBa_2Cu_3Ox$, $Nd_4Ba_2Cu_2Ox$, $SmBa_2Cu_3Ox$, $Sm_2BaCuOx$, $PrBa_2Cu_3Ox$, $Pr_2BaCuOx$, or $HoBa_2Cu_3Ox$. Since the bulk superconductor is formed only of an oxide phase without using a metal such as Ag, a large resistance is generated easily in case of a failure. The bulk superconductor can be easily handled if it is formed into a suitable configuration, such as the shape of a tape.

Another superconducting material that generates high resistance in case of a failure may be a superconductor which is made by forming the above described Re superconducting layer on a metal base plate. Stainless steel, for example, can be used as the metal base plate. The film formation of the Re superconducting layer may be performed by a known method, such as chemical vapor deposition (CVD) or physical vapor deposition (PVD). An intermediate layer may be formed with yttria-stabilized zirconia (YSZ), for example, between the metal base plate and the Re superconducting layer. This superconducting layer also can easily be handled if the metal base plate is formed into a suitable configuration, for example, the shape of a tape.

In the superconducting cable of the present invention, a portion having a small critical current value may be partially provided when forming a superconducting layer during the cable manufacturing process. Alternatively, a cable having a superconducting layer of a large critical current value and a cable having a superconducting layer of a small critical current value may be connected to each other. That is, in the first method of forming the superconducting cable, the former and the electrical insulating layer of the superconducting cable are continuous, being formed without cutting. In the second method, the former and the electrical insulating layer of the superconducting cable are discontinuous, and they are connected through connecting portions.

The present invention is described in greater detail below with reference to the accompanying drawings through illustration of preferred examples. In the drawings, the same elements are designated with like reference numerals, and an explanation thereof is not repeated. The dimensional ratios in the drawings are not necessarily equivalent to those given in the examples.

Example 1

Figure 2:
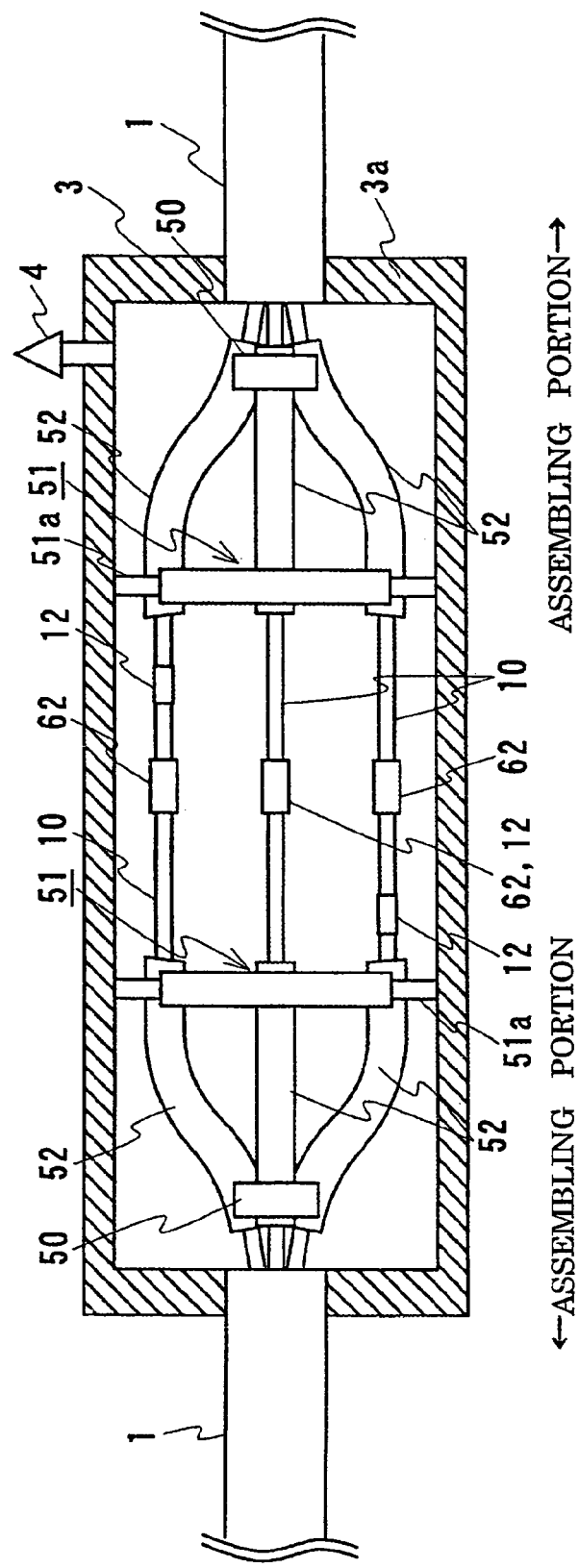
FIG. 2 is a schematic diagram illustrating an intermediate junction of a cable line having a superconducting cable of the present invention; the current limiting portions of the cable cores are located in an intermediate joint box.

FIG. 1 is a schematic diagram illustrating a terminating portion of a cable line having a superconducting cable of the present invention; their current limiting portions 11 are located in a termination joint box 2. A description of a first example and a second example, which appears below, is given in the context of a three-core superconducting cable 1 formed by stranding three cable cores 10, as shown in FIGS. 1 and 2.

Figure 3:
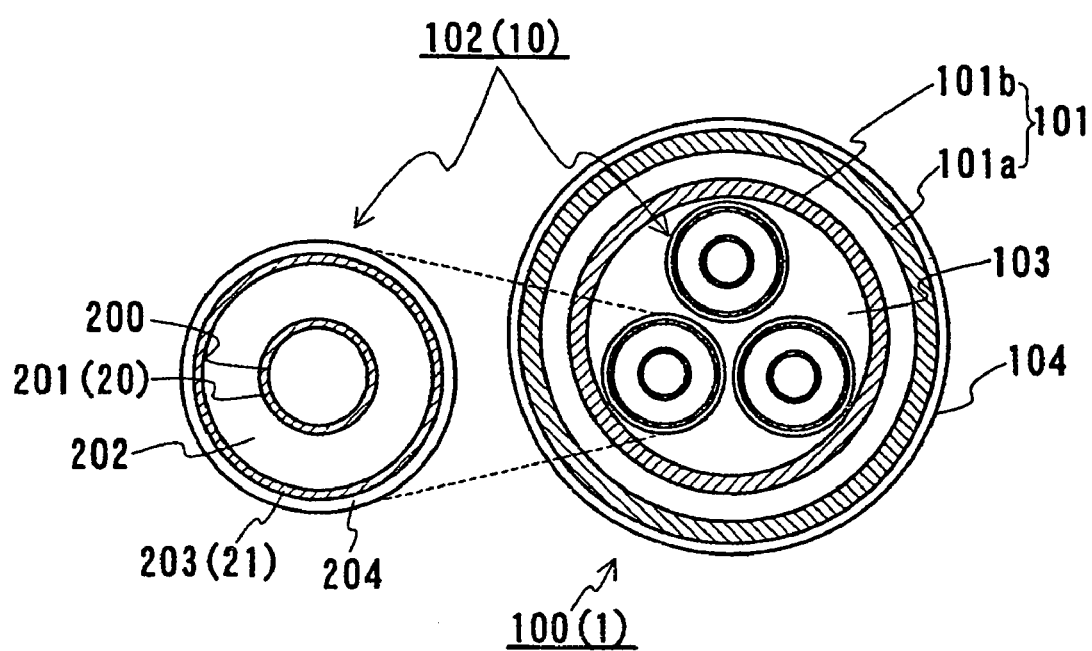
FIG. 3 is a sectional view illustrating a three-core three-phase superconducting cable.

The basic configuration of the superconducting cable 1 is similar to that of the superconducting cable 100 shown in FIG. 3. More specifically, the superconducting cable 1 is formed such that the three cable cores 10, each including, sequentially from the center, the former 200, a superconducting conductor layer 20, the electrical insulating layer 202, a shielding layer 21, and the protective layer 204, are stranded and housed in the thermal insulation pipe 101. The former 200 was formed by stranding a plurality of copper wires each covered with an insulating material. The electrical insulating layer 202 was formed by winding semisynthetic insulating paper (PPLP (registered trademark) produced by Sumitomo Electric Industries, Ltd.) at the outer periphery of the superconducting conductor layer 20. The protective layer 204 was formed by winding kraft paper at the outer periphery of the shielding layer 21. A SUS corrugated pipe was used as the thermal insulation pipe 101, and a thermal insulating material was disposed in a multilayer form between the outer pipe 101a and the inner pipe 101b so as to form a multilayer vacuum thermal insulation structure which was kept in a vacuum state. The anticorrosion layer 104 made of polyvinyl chloride was provided at the outer periphery of the thermal insulation pipe 101.

A feature of the present invention is that portions having different critical current values are provided in the superconducting layer of each cable core 10 forming the superconducting cable 1 of the present invention. Another feature of the present invention is that in a superconducting cable line using the superconducting cable 1 of the present invention, the portions having different critical current values are housed in the termination joint box 2 provided at the terminating portion of the cable line. The first example is described below mainly in the context of these features.

The portions having different critical current values were provided in both the superconducting conductor layer 20 and the shielding layer 21. In these superconducting layers, the current limiting portions 11 having a smaller critical current value than the other portions (hereinafter referred to as the "normal portion") were provided. The superconducting conductor layer 20 and the shielding layer 21 were formed so that the critical current value of the current limiting portions 11 became, for example, $0.9 \times I_c$, where $I_c$ represents the critical current value of the normal portion.

The above-mentioned superconducting layers were formed by spirally winding multiple layers of Bi2223 superconducting tapes which were made by processing Ag—Mn sheathed superconducting wires produced by the powder-in-tube method. In this case, the superconducting tapes used for the current limiting portions 11 were fabricated such that the number of clad wires was decreased compared to those for the normal portion so that the amount of superconductor was reduced. The superconducting tapes used for the current limiting portions 11 and those for the normal portion were connected by soldering.

For the ease of handling each stranded cable core 10 of the superconducting cable 1 having the current limiting portions 11 according to the present invention, the cable cores 10 were split so as to be apart each other. In the termination joint box 2, the cable cores 10 were housed in a manner such that the separating distance between the cable cores 10 was increased gradually from the core-splitting portion. Accordingly, the superconducting cable 1 was housed in the termination joint box 2 in the state in which the stranded portion of the three cable cores 10 was inserted in one face (the right face in FIG. 1) of the termination joint box, and each split portion of the cable cores 10 protruded from the opposing face (the left face in FIG. 1) of the termination joint box. A coolant, for example, liquid nitrogen, fills the termination joint box 2 so as to cool the cable cores 10. Accordingly, the termination joint box 2 is formed in an insulation structure provided with a thermal insulation layer 2a. In this example, the termination joint box 2 was formed in the shape of a cylinder.

The separation of the cable cores 10 housed in the termination joint box 2 are gradually increased as distanced from one face (on the side of the core-splitting portion of the superconducting cable) of the termination joint box 2 toward the other face (on the side of the end of split portion of the cable cores 10) with the distance between the cable cores 10 being kept constant from midway between these faces. In this example, the cable cores 10 are held by a first holding fixture 50 for holding the core-splitting portion of the cable cores 10, a second holding fixture 51 for holding the intermediate portion of the separated cable cores 10, and three intermediate holding fixtures 52 for holding the cable cores 10 by their middle portions between the first holding fixture 50 and the second holding fixture 51.

The first holding fixture 50 has a ring-shaped portion at the center, and the three intermediate holding fixtures 52 are fixed at the outer periphery of the ring-shaped portion. The first holding fixture 50 is disposed between the three cable cores 10 so that the center of the ring-shaped portion is positioned substantially at the center of the space surrounded by the three cable cores 10, and each core 10 is placed in the corresponding intermediate holding fixture 52. With this arrangement, the cable cores 10 can be held such that they are split from each other with a distance therebetween.

The basic configuration of the second holding fixture 51 is substantially similar to that of the first holding fixture 50, and the diameter of the ring-shaped portion of the second holding fixture 51 is made larger than that of the first holding fixture 50. In this example, a sliding portion 51a that substantially point-contacts the inner peripheral surface of the termination joint box 2 is provided so that the second holding fixture 51 is movable in the termination joint box 2 in accordance with the expansion and contraction of the cable cores 10. The sliding portion 51a is fixed at a position, in which the intermediate holding fixtures 52 is not fixed, on the outer periphery of the ring-shaped portion.

The intermediate holding fixtures 52 are formed in the shape of a cylinder by combining semi-circular members, for example, trough-shaped members. In this example, a pair of trough-shaped members cover the outer periphery of the cable core 10 such that they are fixed around the respective outer peripheries of the cable cores 10 by binding the outer periphery of the trough-shaped members with a clamping means, such as a band (not shown), thereby holding the cable cores 10. For facilitating contact between the coolant and the cable cores 10 in the intermediate holding fixtures 52, through-holes may be provided in the intermediate holding fixtures 52.

In this example, the current limiting portions 11 are disposed at the split portion (left side of FIG. 1) of the cable cores 10 in the termination joint box 2.

In this example, a thermal insulation pipe 60 is disposed at the outer periphery of each cable core 10 projecting from the termination joint box 2, as shown in FIG. 1, and a coolant fills the thermal insulation pipes 60, as in the termination joint box 2. Accordingly, the cable cores 10 projecting from the termination joint box 2 can also maintain the superconducting state. Terminating parts 61 that can be connected to another cable core or a connecting device are provided at the end of split portion of the cable cores 10.

In the above-configured superconducting cable 1 of the present invention, when an excessive current flows in the superconducting layers in case of a short-circuit failure, the excessive current exceeds the critical current value in the current limiting portions 11 first since the critical current value thereof is smaller than that of the normal portion, and consequently a large resistance is generated to heat the current limiting portions 11 mainly. As a result, the current limiting portions 11 are damaged; however, damage to the normal portion can be reduced or eliminated. As described above, portions to be damaged in case of a failure are deliberately provided, thereby effectively preventing the other portions from being damaged. Thus, according to the superconducting cable line using such a superconducting cable 1 of the present invention, damage to the overall superconducting cable line can be reduced.

In this example, since the current limiting portions 11 are housed in the termination joint box 2, a damaged portion can easily be checked in case of a short-circuit failure, and thereby excellent repairing workability can be attained. Also in this example, the current limiting portions 11 are disposed at the split portion of the cable cores 10 in the termination joint box 2 where the cable cores 10 are sufficiently separated from each other, and thus, a damaged portion can easily be repaired.

Example 2

FIG. 2 is a schematic diagram illustrating an intermediate junction of a cable line having the superconducting cable 1 of the present invention; a limiting portion 12 is disposed within an intermediate joint box 3. The basic configuration of the superconducting cable 1 of the second example is similar to that of the first example shown in FIG. 1 in that the current limiting portions 12 having a smaller critical current than the other portions (normal portion) are provided for the superconducting layers of each cable core 10. However, the configuration of the current limiting portions 12 is different from that of the current limiting portions 11 of the first example, and the current limiting portions 12 are housed in the intermediate joint box 3. The second example is described below mainly in the context of these differences.

In this example, in two of the three cable cores 10, the current limiting portions 12 were formed by differentiating the number of superconducting wires for the superconducting layers from that for the normal portion, and in the rest one of the cable cores 10, the current limiting portion 12 was formed by differentiating the superconducting material of the superconducting layers from that for the normal portion.

In this example, the superconducting layers (i.e., the superconducting conductor layer 20 and the shielding layer 21) of the cable cores 10 were formed by spirally winding multilayer Bi2223 superconducting tapes which were made by processing Ag—Mn sheathed superconducting wires formed by the powder-in-tube method. As for two cable cores 10 (the uppermost core and the lowest core in FIG. 2) of the three cable cores 10, their current limiting portions 12 were formed by decreasing the number of superconducting tapes constituting the superconducting conductor layer 20 and the shielding layer 21 as compared with that for the normal portions so that the critical current value of the current limiting portions 12 became $0.9 \times I_c$, where $I_c$ represents the critical current of the normal portion. The superconducting tapes used for the current limiting portions 12 and the superconducting tapes used for the normal portion were connected together by solder.

The cable cores 10 were connected to each other by using a joint attachment 62. In the connection of the cable cores using the joint attachments 62, the connection of the cable cores 10 which are shown as the second cable core from the top in FIG. 2 was done with a superconducting part being provided between the cable cores 10 so as to be in contact with the superconducting conductor layer 20 and the shielding layer 21. For example, the superconducting part was formed from a superconductor made of a Bi2223 oxide superconducting phase without a metal matrix so that the critical current value thereof became $0.9 \times I_c$, where $I_c$ represents the critical current value of the normal portion.

In this example, the current limiting portions 12 were disposed substantially at the center of the intermediate joint box 3, namely, they were located at a position distanced from both sides of the joint box (i.e., at a position distanced from the assembled portion of the cable cores 10), in which the cable cores 10 were sufficiently separated from each other.

In the superconducting cable 1 of the present invention having the above-described current limiting portions 12, the connection of the cable cores 10 was facilitated by disassembling the stranded cable cores 10 so as to be separated from each other in a manner in which the separating distance was gradually increased. The connected parts of the split cable cores 10 are housed in the intermediate joint box 3. Accordingly, the portion of the superconducting cable 1 in which the three cable cores 10 are stranded is inserted in one face (the right side face in FIG. 2) of the intermediate joint box 3 and the opposing face (the left side face in FIG. 2), respectively. As in the case of the termination joint box 2, a coolant, such as liquid nitrogen, fills the intermediate joint box 3 so as to cool the cable cores 10. Accordingly, the intermediate joint box 3 has an insulation structure in which a thermal insulation layer 3a is provided. In this example, the intermediate joint box 3 was formed in the shape of a cylinder.

In the example, the intermediate joint box 3 has a regulating valve 4, which regulates the pressure in the intermediate joint box 3 when the coolant around the current limiting portions 12 is vaporized by the heat generated due to a current flowing in the current limiting portions 12 as a result of a short-circuit failure. Although in this example only one regulating valve 4 is disposed, more than one valve 4 may be provided.

What is claimed is:

1. A method of manufacturing a superconducting cable comprising:

employing a superconducting layer in at least one cable core, the superconducting layer in the at least one cable core having a first, current limiting superconducting cable portion and a second, normal superconducting cable portion, the first portion having a critical current value different from a critical current value of the second portion, each of the first portion and the second portion having a plurality of clad wires comprising a superconductive material;

wherein making the superconducting layer comprises making the critical current value of the first portion to be smaller than that of the second portion and assembling the first portion and the second, normal portion; and housing the first portion inside a splitter configured to separate cable cores;

wherein the clad wires of the first portion are fewer in number than the clad wires of the second portion so that the amount of the superconductive material in the first portion is reduced compared to the second portion, and wherein assembling the first portion and the second portion comprises coupling the clad wires of the first portion with the clad wires of the second portion.

2. The method of manufacturing a superconducting cable, as recited in claim 1, wherein the critical current value of the first portion is about 90% of the critical current of the second portion.

3. A method of manufacturing a superconducting cable, as recited in claim 1, further comprising providing a shielding layer at the outer periphery of the superconducting layer.

4. A method of manufacturing a superconducting cable, as recited in claim 1, wherein the at least one cable core comprises a plurality of the cable cores, each including the superconducting layer and having the first portion and the second portion as recited in claim 1.

5. A method of manufacturing a superconducting cable, as recited in claim 4, further comprising cooling the superconducting cable with a coolant filling the splitter, and regulating the pressure in the splitter using a regulating valve when the coolant vaporizes.

6. A method of manufacturing a superconducting cable, as recited in claim 4, wherein housing the first, current limiting superconducting portion inside a splitter comprises placing the first, current limiting superconducting portion in a splitter at a position distanced from the second portion of the cable cores; further comprising placing the first, current limiting superconducting portion at the end portion of the cable cores in the case of the splitter being a termination splitter, and at a central position in the case of the splitter being an intermediate splitter.

7. The method of manufacturing a superconducting cable, as recited in claim 1, wherein coupling the clad wires of the first portion with the clad wires of the second portion comprises soldering the clad wires of the first portion and the clad wires of the second portion.

8. The method of manufacturing a superconducting cable, as recited in claim 1, wherein the first portion is a sacrificial portion for absorbing damage caused by a short-circuit failure and for reducing damage caused by the short-circuit failure to the second portion.

9. The method of manufacturing a superconducting cable, as recited in claim 1, further comprising laying the at least one cable core in duct lines under ground.

10. The method of manufacturing a superconducting cable, as recited in claim 1, wherein the at least one cable core comprises a plurality of cable cores and the splitter is configured to separate the cable cores from each other along their respective length dimensions by arranging the cable cores with their length dimension at an angle so that a distance between the cable cores increases in one direction along the length dimension.

11. The method of manufacturing a superconducting cable, as recited in claim 10, further comprising:
    containing a coolant in the splitter, for cooling the superconducting cable; and
    regulating a pressure inside the splitter when the coolant vaporizes in the splitter.

12. The method of manufacturing a superconducting cable, as recited in claim 11, wherein the coolant vaporizes when the current limiting portion is quenched in response to a current.

13. The method of manufacturing a superconducting cable, as recited in claim 1, wherein the at least one cable core comprises a plurality of cable cores and wherein the method further comprises housing the first, current limiting portion of each of the plurality of cable cores in a splitter housing structure and separating the plurality of cable cores from each other.

* * * * *